(12) United States Patent
Clifton et al.

(10) Patent No.: US 8,904,171 B2
(45) Date of Patent: Dec. 2, 2014

(54) SECURE SEARCH AND RETRIEVAL

(75) Inventors: Christopher J. Clifton, West Lafayette, IN (US); John Ross Wallrabenstein, West Lafayette, IN (US); David Stork, Portola Valley, CA (US)

(73) Assignee: Ricoh Co., Ltd., Tokyo (JP)

( * ) Notice: Subject to any disclaimer, the term of this patent is extended or adjusted under 35 U.S.C. 154(b) by 370 days.

(21) Appl. No.: 13/341,638

(22) Filed: Dec. 30, 2011

(65) Prior Publication Data

US 2013/0173917 A1    Jul. 4, 2013

(51) Int. Cl.
  *H04L 9/00*  (2006.01)
  *H04L 9/14*  (2006.01)

(52) U.S. Cl.
  USPC ......................................................... 713/167

(58) Field of Classification Search
  CPC ................ H04L 9/00; H04L 9/14; H04L 9/30
  USPC ........................................................ 713/167
  See application file for complete search history.

(56) References Cited

U.S. PATENT DOCUMENTS

| | | | |
|---|---|---|---|
| 4,567,600 A | | 1/1986 | Massey et al. |
| 5,454,046 A | * | 9/1995 | Carman, II ..................... 382/186 |
| 5,855,018 A | | 12/1998 | Chor et al. |
| 6,785,810 B1 | * | 8/2004 | Lirov et al. .................... 713/165 |
| 2008/0005476 A1 | * | 1/2008 | Venkatesan et al. .......... 711/118 |
| 2009/0300351 A1 | | 12/2009 | Lei et al. |
| 2010/0146299 A1 | | 6/2010 | Swaminathan et al. |
| 2010/0169293 A1 | | 7/2010 | Gerber |
| 2011/0119481 A1 | * | 5/2011 | Auradkar et al. ............. 713/150 |
| 2011/0145593 A1 | * | 6/2011 | Auradkar et al. ............. 713/189 |
| 2013/0046974 A1 | * | 2/2013 | Kamara et al. ................ 713/165 |

OTHER PUBLICATIONS

Asonov, Dmitri, et al., "Private Information Retrieval, Optimal for Users and Secure Coprocessors" Humboldt-Universitat zu Berlin, 10099 Berlin, Germany, German Research Society, Berlin-Brandenburg Graduate School in Distributed Information Systems (DFG grant No. GRK 316), 2002, 16 pages.

Asonov, Dmitri, et al., "Almost Optimal Private Information Retrieval," Humboldt-Universitat zu Berlin, 10099 Berlin, Germany, German Research Society, Berlin-Brandenburg Graduate School in Distributed Information Systems (DFG grant No. GRK 316), 2003, 20 pages.

Goldreich, Oded, et al., "Private Information Retrieval," Journal of the ACM, vol. 45, No. 6, Nov. 1998, pp. 965-982.

(Continued)

*Primary Examiner* — William Powers
(74) *Attorney, Agent, or Firm* — Blakely, Sokoloff, Taylor & Zafman LLP (57) ABSTRACT

A method and apparatus is disclosed herein for secure search and retrieval. In one embodiment, the method comprises receiving an encrypted, permuted search tree with nodes that have been permuted and encrypted, the encrypted permuted search tree having been encrypted with a first private encryption key; receiving, at a server, a query from a client, the query comprising a set of keywords, wherein each query term is encrypted with the first private encryption key; performing a search using the query, including performing an oblivious matching keyword test in which an evaluation occurs at each node of the tree to determine if one or more matches exist; and returning results based on a match of keywords for each document, the results including one or more encrypted leaf nodes of the tree, the encrypted leaf nodes encrypted with the first private encryption key.

15 Claims, 8 Drawing Sheets

(56) References Cited

OTHER PUBLICATIONS

Ostrovsky, Rafail, et al., "A Survey of Single-Database PIR: Techniques and Applications," PKC'07: Proceedings of the 10$^{th}$ International Conference on Practice and Theory in Pubic-Key Cryptography, 2007, 20 pages.

Chitu, Alex, "Google Secure Search," <http://www.googlesystem.blogspot.com/2010/05/google-secure-search.html>, May 22, 2010.

* cited by examiner

(a) The original search tree before any transformations.

(b) As the flip bit β= 1, nodes 1 and 2 are swapped along with all of their children.

(c) As the flip bit β= 1, nodes 5 and 6 are swapped along with all of their children (d) As the flip bit β= 0, nodes 3 and 4 are not swapped.

SECURE SEARCH AND RETRIEVAL

FIELD OF THE INVENTION

Embodiments of the present invention relate to the field of search and retrieval; more particularly, embodiments of the present invention relate to privacy preserving document searches in which a server in possession of a memory (e.g., database) to be searched allows clients to issue queries, where the server learns nothing about the contents of records returned for each client's query while the client learns only the result of the search.

BACKGROUND OF THE INVENTION

Several private information retrieval (PIR) schemes exist in the prior art. These (PIR) schemes allow a user to retrieve information (e.g., a document) from a database using a server without revealing the information they are retrieving. PIR is similar to 1-out-of-n oblivious transfer, where the user also does not get information about other information in the database. In the area of single-database symmetric PIR with preprocessing, a client making a query learns nothing more than the result of their query, while the server learns nothing about the contents of records returned for the query. The preprocessing stage in such a scheme is completed before engaging in the query stage.

PIR schemes generally require O(n) computation, with the exception of some systems with multiple servers. One prior art scheme achieves constant query time on a single server, but with $O(n^2)$ preprocessing per query. This scheme also makes use of a shuffling protocol to generate a shuffled hash table (as opposed to use in generating a shuffled tree structured index) and also requires use of a secure coprocessor. Other prior art techniques also make use of a shuffled hash table to achieve constant time queries with O(n) preprocessing, but require storing all data and performing the query at the client machine.

The PIR protocols used PIR schemes have employed various cryptosystems. A number of cryptosystems are well-known in the art and have a variety of properties.

Some cryptosystems have a commutative property. That is, the order in which encryption and decryption operations are applied does not affect the result of the operations. In a non-commutative encryption scheme, the order of the operations is relevant to the result. For example, consider a plaintext message m that has been encrypted with key $k_1$ to yield the ciphertext $c_1 = E_{k_1}(m)$. Further, encrypt $c_1$ with key $k_2$ to yield the ciphertext $c_2 = E_{k_2}(E_{k_1}(m))$. In a noncommutative encryption scheme, decrypting with $k_1$ before $k_2$ yields garbage, while decrypting in the reverse order ($k_2$, $k_1$) yields the message m:

$$D_{k_2}(D_{k_1}(E_{k_2}(E_{k_1}(m)))) = \perp$$
$$D_{k_1}(D_{k_2}(E_{k_2}(E_{k_1}(m)))) = m$$

In other words:

$$D_{k_2}(D_{k_1}(c_2)) \neq D_{k_1}(D_{k_2}(c_2))$$

Commutative cryptosystems differ in that the following relation holds:

$$D_{k_2}(D_{k_1}(c_2)) = D_{k_1}(D_{k_2}(c_2))$$

Thus, the order of the operations does not affect the result. A commutative encryption scheme is useful in that it enables the entries in the database to be securely shuffled without revealing the location of any element to either party. With respect to some previous solutions, the commutative encryption scheme will serve as the secure coprocessor for our protocol.

A cryptosystem with a homomorphic property allows some subset of mathematical operations to be performed on encrypted messages. This is a desirable property, as it allows many simple functions to be computed securely and efficiently. In general, a homomorphic cryptosystem supports some binary operator $\diamond$, where the following property holds:

$$E(x) \cdot E(y) = E(x \diamond y)$$

A cryptosystem is additively homomorphic when $\diamond$ is the addition operator, or multiplicatively homomorphic when $\diamond$ is the multiplication operator. For example, the Paillier cryptosystem is additively homomorphic, while the ElGamal and Massey-Omura are multiplicatively homomorphic. The Goldwasser-Micali cryptosystem supports the more complex binary operator exclusive-or. A multiplicatively homomorphic encryption scheme satisfies the property:

$$E(x) \cdot E(y) = E(x \cdot y)$$

At least one prior art PIR scheme uses Paillier's additively homomorphic cryptosystem, which requires O(n) computation and database communication of O(kd), where k is the security parameter and $d \in \mathbb{Z}^+$.

U.S. Pat. No. 6,167,392 describes a single-database PIR scheme based on the use of homomorphic encryption and the quadratic residuosity assumption. This PIR scheme requires a repeated interaction between the client and server until the desired record can be retrieved. Here, our invention achieves the goal with a constant number of rounds.

U.S. Pat. No. 5,855,018 describes another PIR scheme that requires the use of non-colluding replicated database servers.

SUMMARY OF THE INVENTION

A method and apparatus is disclosed herein for secure search and retrieval. In one embodiment, the method comprises receiving an encrypted, permuted search tree with nodes that have been permuted and encrypted, the encrypted permuted search tree having been encrypted with a first private encryption key; receiving, at a server, a query from a client, the query comprising a set of keywords, wherein each query term is encrypted with the first private encryption key; performing a search using the query, including performing an oblivious matching keyword test in which an evaluation occurs at each node of the tree to determine if one or more matches exist; and returning results based on a match of keywords for each document, the results including one or more encrypted leaf nodes of the tree, the encrypted leaf nodes encrypted with the first private encryption key.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

A method, apparatus and article of manufacture are described herein for performing a private keyword search over a document base held by a server. In one embodiment, the document base is a database containing patents and the keyword search returns identifiers of patents (or the patents themselves) that match the keyword search. The techniques described herein allow a client to issue a query consisting of a set of keywords to a server, which returns results based on a match of keywords for each document to the server. In one embodiment, the server does not learn the query, and the client learns only the result. Specifically, this enables a client to utilize an information retrieval system (e.g., a patent information retrieval system) where retrieval is based on a match of keywords to be used without revealing the objectives of the search to the server.

In one embodiment, the PIR scheme uses a single preprocessing step, which is followed by an unlimited number of $O(\log n)$ queries. The preprocessing stage reduces the $\Omega(n)$ computational complexity required by all other single-database PIR schemes. Additionally, no communication between the client and server is necessary for the server to evaluate the client's query. In one embodiment, the PIR scheme described herein supports a best match where a document and query may each have multiple keywords, and the same keyword occurs in multiple documents.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Overview

Figure 1:
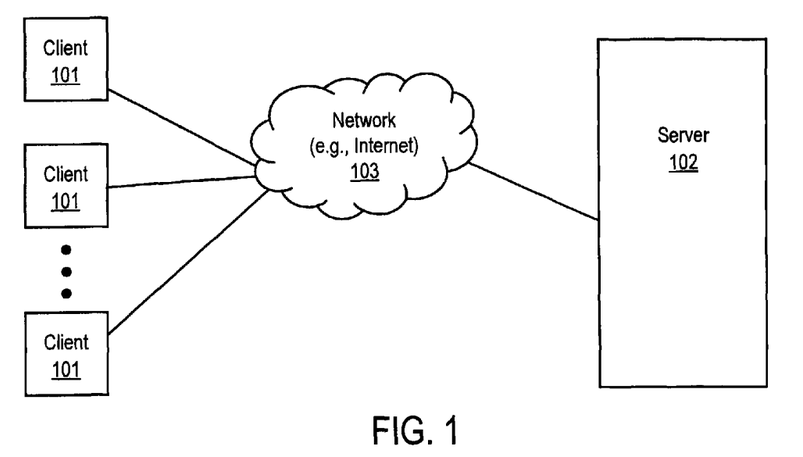
FIG. 1 illustrates a retrieval system.

FIG. 1 illustrates a private information retrieval (PIR) system. Referring to FIG. 1, clients 101 generate queries and send queries to server 102, via a network 103 (e.g., the Internet) to search a database 104 that is accessible by server 102. In one embodiment, the database is a document database (e.g., a database containing patent documents). In one embodiment, database 104 is coupled to network 103. However, database 104 may be coupled to server 102.

In one embodiment, the PIR system utilizes a multiplicatively homomorphic encryption system, a tree-structured index obfuscated using a shuffling procedure, and an oblivious matching keyword test to generate the result set.

In one embodiment, the PIR system uses a complete tree-structured index constructed to partition document identifiers on the basis of the inverse document frequency with which keywords appear in a document. By having the search tree constitute a complete tree, an adversarial server is prevented from constructing a mapping between a client's encrypted query result and specific patent identifiers and associated keywords. If a less structured tree were used, information such as the number of children a given node has, or the depth of a particular path through the tree, may reveal additional information to an adversarial server.

The tree shuffling protocol prevent an adversarial server from constructing a mapping between a client's encrypted query result and specific patent identifiers and associated keywords. To fulfil this, in one embodiment, each level of the index tree is permuted at random by the client, which obfuscates the mapping between a given path through the tree and the result when evaluated by the server.

Querying the search tree returns the result set that satisfies the keywords in the client's query. In one embodiment, when performing a search, at each node, the search tree selects the branches with the highest match count of query terms to patent keywords. In one embodiment, a query containing multiple keywords may also result in multiple paths through the search tree, returning multiple patent identifiers; the most frequently returned are chosen as the best match for the query.

In one embodiment, when performing the best match keyword comparison, the keyword sets are not revealed (i.e., they are kept private). To that end, techniques described herein employ a Massey-Omura cryptosystem to maintain the privacy of both the query and the database. Embodiments of the invention make a compromise between full privacy guarantees and efficiency by relaxing the requirement of semantic security for the multiplicatively homomorphic encryption system. In this manner, the server is able to evaluate a query's path through the search tree in logarithmic time, without communicating with the client. Although semantic security has been removed, the server cannot generate encryptions of potential keywords and compare the result as they do not have the client's encryption key or decryption key.

Embodiments of the Search Process

The elements of the basic process are described in more detail below.

1) Search Tree Construction

To reduce the cost of each query Q issued over the database D, a search tree T is constructed as follows: let each node contain a set of match term and synonym fragments, where the size of each node is $s_i$ at level i of the tree. The leaf nodes contain a set of patent identifiers, whose associated patent documents contain the query terms in the nodes from the root to the leaf node. Note that in one embodiment all leaf nodes satisfy the same constraint as the internal nodes; that is, each leaf node has size $s_l$, where l is the bottom most level of T. In one embodiment, the search tree is balanced, with all leaf nodes at the same level. If this were not the case, shuffling the tree may reveal information if a single leaf node exists at some level k. By having a balanced search tree, the server cannot associate a given leaf node with the patent identifiers it contains. In one embodiment, if a node at some level is not filled, it is padded with "dummy" query terms so that the size constraint is met. The server (e.g., server 102 of FIG. 1) encrypts the nodes of the decision tree T with a server's private encryption key $e_S$ and sends the result to the client (e.g., client 101 of FIG. 1). The client returns a shuffled decision tree T' encrypted with client's private encryption key $e_C$ so that the server no longer knows the organization of the tree. The server then applies its decryption key $d_S$ to the nodes, resulting in a decision tree T' encrypted only with the client's key $e_C$.

In one embodiment, the interior nodes of the search tree are constructed as follows:

Definition Let $t_i$ be a keyword or synonym, where $t_{ij}$ denotes the $j^{th}$ character of t. A fragment is defined as $f_{ij} := t_{i1} | \ldots | t_{ij}$, where | denotes concatenation.

Definition A fragment set is defined as $S_{ij} := \{f_{1j}, \ldots, f_{ij}\}$, where $S_{ij}$ contains i fragments of length j. The size of a fragment set is denoted as $|S_{ij}|=i$.

Definition A mapping is defined as $M := S_{ij} \to \mathbb{Z}^+$, where M(S) maps a fragment set S to an integer value.

Definition A node is defined as $n_{kl} = M(S_{ij})$, where $n_{kl}$ is the $l^{th}$ node at depth k. That is, each node contains the integer value that corresponds to some fragment sets given by $M(S_{ij})$ for fragment set $S_{ij}$.

A given keyword $t_i$ is split into a series of fragments, each of which progressively contains more of the original keyword. If $|t_i|=10$, then $f_{i4}$ and $f_{i8}$ represent the first four (resp. eight) characters of $t_i$. By definition, $f_{i4} \in S_{j4}$ and $f_{i8} \in S_{j8}$. That is, a fragment of length l is a member of some fragment set $S_{jl}$. In one embodiment, it must hold that for all nodes $n_{kl}=S_{qr}$, $n_{k+1,j}=S_{st}$ we have that $r+1 \le t$, so nodes at deeper levels contain fragment sets of greater length. All nodes at the same level, $n_{kl}, \ldots, n_{kl}$, contain fragment sets with the same number of fragments. Finally, the mapping M from a given fragment set to the positive integers is known to the client.

Figure 2:
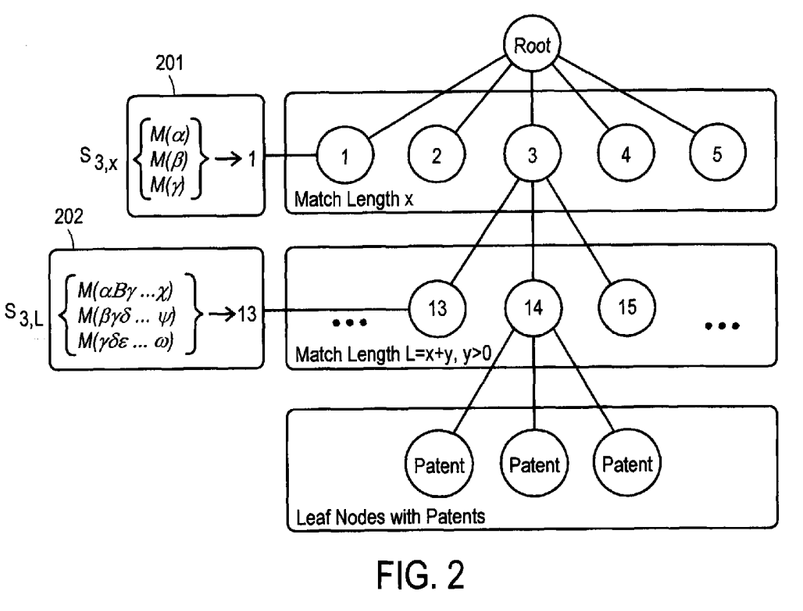
FIG. 2 illustrates search tree construction.

FIG. 2 illustrates portions of the construction of a search tree. Referring to FIG. 2, a portion 201 of the search query illustrates a search with level number "3" that has a length of "x" characters (as indicated by $S_{3,x}$). In this case, portion 201 of the search query is 1 character in length. Also shown in FIG. 2 is a portion 202 of the search query that includes the $3^{rd}$ level search of L characters, where L is equal to 13.

2) Query Construction

In one embodiment, to construct a query, the client wishes to issue a single query term $q_{1k} \in Q$, where $q_{1k}$ contains k characters. The mapping M contains fragment sets of length r, s and t, where $r<s<t<k$. The client constructs their query set Q as $Q=\{M(q_{1r}); M(q_{1s}); M(q_{1t}); q_{1k}\}$. That is, the client constructs fragments of length r, s and t from q, and then evaluates each fragment using the mapping M to obtain the corresponding value in $\mathbb{Z}^+$. Finally, the full query term is included for matching at the leaf node.

3) Shuffling Protocol

In one embodiment, in order to allow the server S to process all of the queries for a client, the database satisfies two requirements: the database is encrypted with the client's encryption key to prevent the server from viewing the records, and the database records themselves are in a random order unknown to server S. This can be accomplished by applying the commutative encryption scheme. In one embodiment, the shuffling protocol is as follows:

1) server S encrypts database D with the private encryption key $e_S$ and gives $E_{e_S}(D)$ to the client 2) The client randomly shuffles the records in $E_{e_S}(D)$, encrypts the result with its private encryption key $e_C$, and returns $E_{e_C}(E_{e_S}(D))$ to S.

3) server S applies their decryption key $d_S$ to the database to yield $E_{e_C}(D)$.

Note that at no point in the protocol does the client have access to an unencrypted copy of database D. At the end of the protocol, the server S has a copy of database D encrypted with the client's key, where the records have been permuted such that the server S does not know the location of any record. Thus, the server may process queries for the client and remains oblivious to the result of the query or the value of records accessed at any given location. Repeated queries may reveal to the server which records are accessed most frequently, although the content of those records is not known to the server. (It is only after queries are issued that the frequency can be revealed; the shuffling procedure itself does not reveal them.) To address this, in one embodiment the shuffling procedure may be repeated as often as is necessary to satisfy the client's desired level of privacy.

Figure 3:
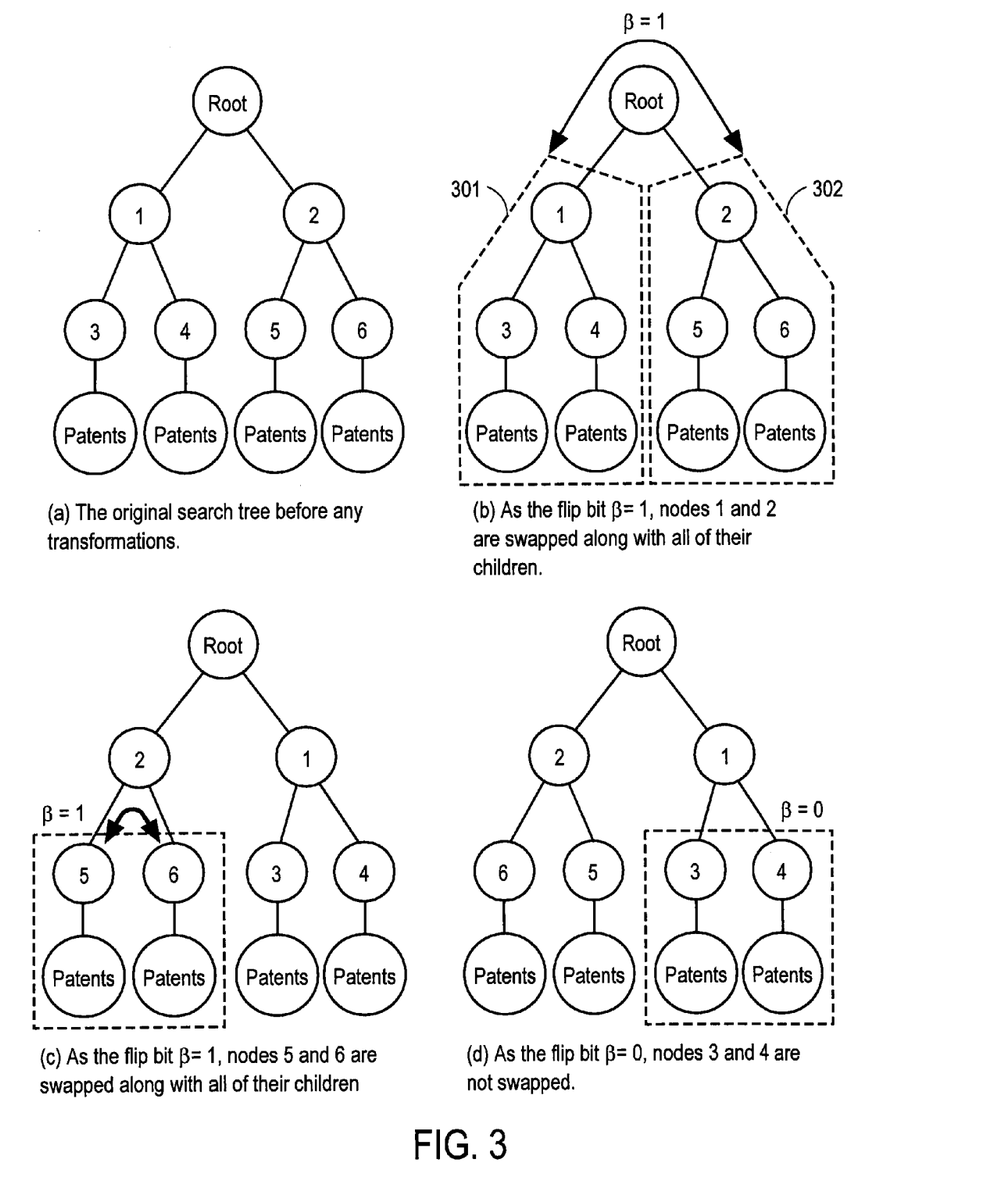
FIGS. 3A-D illustrate an example of the shuffling protocol.

FIGS. 3A-D illustrate an example of one embodiment of a shuffling procedure. FIG. 3A illustrates a search tree prior to any transformations. In FIG. 3B, as the flip bit $\beta=1$, nodes 1 and 2 are swapped along with all their children nodes. Thus, all the nodes in node group 301 are swapped with the nodes in node group 302. FIG. 3C illustrates that nodes 5 and 6 are swapped along with their children, which are the patents in this example, if the flip bit β=1. FIG. 3D illustrates that nodes 3 and 4 are not swapped if the flip bit β=0. This process is repeated all the way down to the leaf nodes. In the case of FIGS. 3A-D, the leaf nodes are patent identifiers.

4) Query Evaluation

Figure 4:
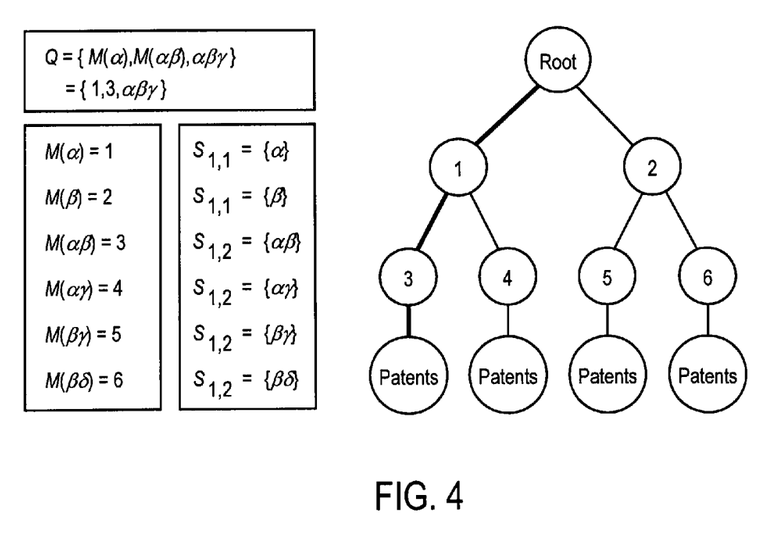
FIG. 4 illustrates the query evaluation process.

When the client wishes to issue a query Q over the database D, the multiplicative inverse $q_i^{-1}$ of each query term $q_i \in Q$ is encrypted with the client's key $e_C$ and sent to the server S. At each node N of the decision tree, server S performs $e_C(n_j) \cdot e_C(q_i^{-1}) \forall n_j \in N$, $q_i^{-1} \in Q$. If $e_C(n_j) \cdot e_C(q_i^{-1}) = 1$ for any $q_i^{-1} \in Q$, a match was found and the right child of N is evaluated. Otherwise, the left child is evaluated. When a child node is reached, the result set can be further refined if Q consists of a conjunction of query terms. As each leaf node element is an association $\langle e_C(patent_{id}), e_C(q_1), \ldots, e_C(q_n) \rangle$, the server can return only those elements where all $q_i \in Q$ are matched. FIG. 4 illustrates one embodiment of the query evaluation process.

a) Multiplicative Inverse Equality Test: In one embodiment, the terms and leaf node elements are encrypted using the Massey-Omura public key cryptosystem, which is well-known in the art. The Massey-Omura system is both multiplicatively homomorphic and commutative. The crypto system is an adaptation of the Pohlig-Hellman private-key cipher. In the Massey-Omura cipher, the public key is the prime modulus p, while the encryption and decryption keys are private for each user. That is, Alice and Bob agree on a large prime p and each locally compute $e_A$, $d_A$ (resp. $e_B$, $d_B$) such that $e_A d_A \equiv 1 \pmod{p-1}$ (resp. $e_B d_B$). The shared prime modulus p is usually chosen to be of the form $p=2^m-1$; that is, the modulus is a Mersenne Prime. Here, the encryption function is given by:

$$E_A(x) = x^{e_A} \pmod{p} = C$$

The decryption function is given by:

$$D_A(C) = C^{d_A} \pmod{p} = x$$

The encryption scheme is commutative, as indicated by:

$$x^{e_A e_B d_A d_B} = x^{d_B e_B d_A e_A} \pmod{p}$$

Further, the encryption scheme is multiplicatively homomorphic, as indicated by:

$$x^{e_A} \cdot y^{e_A} \equiv (x \cdot y)^{e_A} \pmod{p}$$

Based on this, the equality test under the Massey-Omura cryptosystem may be given. Here, $e_A$ represents Alice's encryption key. To test the equality between an unknown element x and a query Q, Bob has been given $E_{e_A}(x)$ and $E_{e_A}(Q^{-1})$ by Alice. Let the shared prime modulus be p. Then it is that:

$$E_{e_A}(x) \cdot E_k(Q^{-1}) = E_k(x \cdot x^{-1}) = E_k(1) s \cdot t \cdot x = Q$$

Specifically, Massey-Omura performs the following operations to test equality:

$$x^{e_A} \cdot (Q^{-1})^{e_A} \pmod{p} = 1 \pmod{q} s \cdot t \cdot x = Q$$

If the condition x=Q does not hold, then the result is indistinguishable from a random group element $g \in GF(2^n)$. Bob need not possess Alice's encryption key $e_A$ to distinguish between cases where equality holds from those where it does not. Massey-Omura is not a semantically secure encryption system, and does not employ randomness. Thus, $E_k(1)=1$, allowing Bob to discern whether or not two elements are equal when one is given as the other's multiplicative inverse modulo the public prime modulus.

Privacy Preserving Protocol

In one embodiment, the PIR system uses the elements above to employ a privacy preserving protocol. With a database D and a query Q are given, where the goal is to compute S(Q), where S is the search algorithm over database D. Assuming that a server has access to database D in unencrypted form, and that a client wishes to execute a query Q over database D, the server and the client generate a shared Mersenne prime modulus p of the form $p=2^m-1$ and respective encryption and decryption keys for Massey-Omura. The server generates the decision tree T and the client receives the decision tree and uses a shuffling protocol to randomize the tree organization. The client computes $E_{e_C}(Q^{-1})$, which is possible because any group element $g \in GF(2^n)$ has a multiplicative inverse $g^{-1} \in GF(2^n)$ when $GF(2^n)$ has prime order p. The client sends $Q = E_{e_C}(Q^{-1})$ to the server, which runs S(Q), where S(x) is the decision tree evaluation algorithm previously described. The server uses the secure equality test described for Massey-Omura to find a subset $P \subseteq N$ for the leaf node N such that $\forall p_i \in P$, $q_j = p_i$. That is, the server returns the set of database records where the query matches the record. The server distinguishes matching records from differing records, as $E_{e_C}(p_i) \cdot E_{e_B}(q_j^{-1}) = 1$ when $p_i = q_j$. Thereafter, the server returns this set to the client, who can decrypt the elements because the client knows its decryption key $d_C$. The server learns only which encrypted records matched the client's query, but not their values. Over time, the server will learn the frequency of records returned to the client unless the shuffling procedure is repeated. The client learns nothing about database D other than the result subset $P \subseteq N$ that is returned as the answer to Q.

Examples of Flow Diagrams of a Search Process

Figure 5:
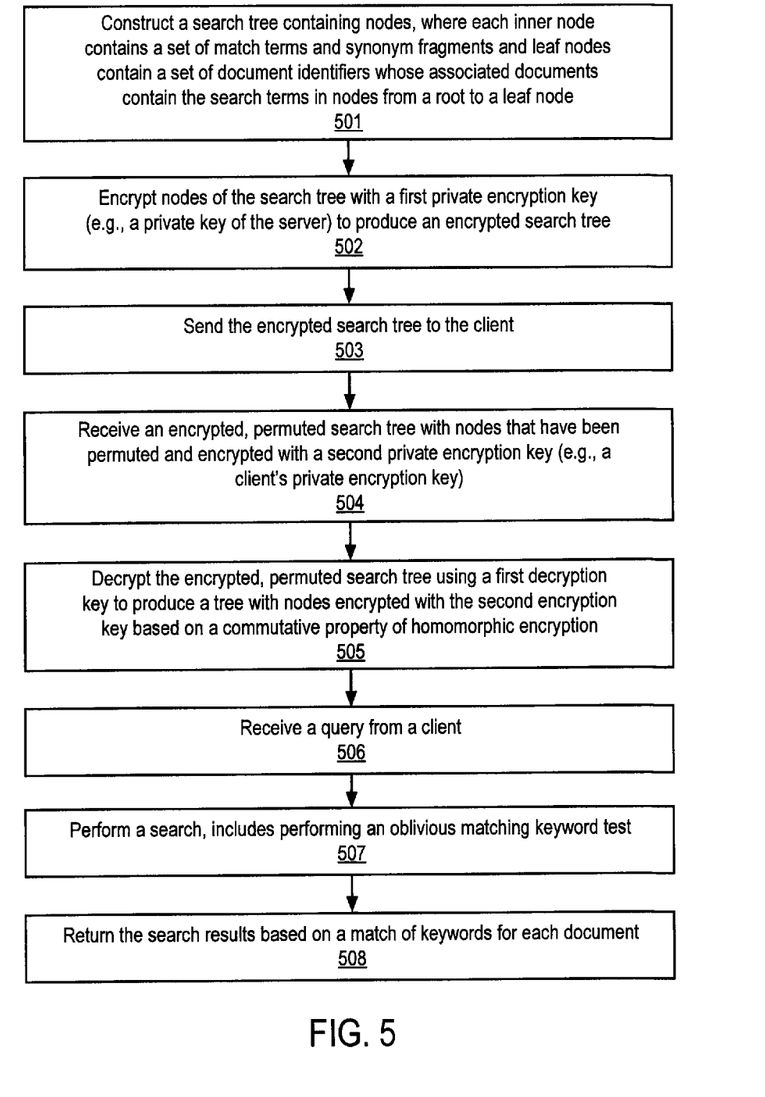
FIG. 5 is a flow diagram of one embodiment of a process for performing a search on a set of documents.

FIG. 5 is a flow diagram of one embodiment of a process for performing a search on a set of documents. The process is performed by processing logic that may comprise hardware (circuitry, dedicated logic, etc.), software (such as is run on a general purpose computer system or a dedicated machine), or a combination of both. In one embodiment, the process is performed by a server.

Referring to FIG. 5, the process begins by processing logic constructing a search tree containing nodes, where each inner node contains a set of match terms and synonym fragments and leaf nodes contain a set of document identifiers whose associated documents contain the search terms in nodes from a root to a leaf node (processing block 501). In one embodiment, the search tree is balanced.

Next, processing logic encrypts nodes of the search tree with a first private encryption key (e.g., a private key of the server) to produce an encrypted search tree (processing block 502). After encrypting the nodes, processing logic sends the encrypted search tree to the client (processing block 503).

Subsequently, processing logic receives an encrypted, permuted search tree with nodes that have been permuted and encrypted with a second private encryption key (e.g., a client's private encryption key) (processing block 504). In one embodiment, the nodes in the permuted search tree have been permuted separately using a shuffling procedure to obfuscate the tree.

Once received, processing logic decrypts the encrypted, permuted search tree using a first decryption key to produce a tree with nodes encrypted with the second encryption key based on a commutative property of homomorphic encryption (processing block 505). In one embodiment, the homomorphic encryption comprises a Massey-Omura public key cryptosystem.

Processing logic receives a query from a client, where the query comprises a set of keywords, and each query term is encrypted with the second private encryption key (processing block 506). In one embodiment, the query comprises an encrypted version of a multiplicative inverse of each query term.

Using the query, processing logic performs a search, which includes performing an oblivious matching keyword test in which an evaluation occurs at each node of the tree to determine if one or more matches exist (processing block 507).

Once the search has been completed, processing logic returns the search results based on a match of keywords for each document (processing block 508). The results include one or more encrypted leaf nodes of the tree, where the encrypted leaf nodes encrypted with the second private encryption key.

Figure 6:
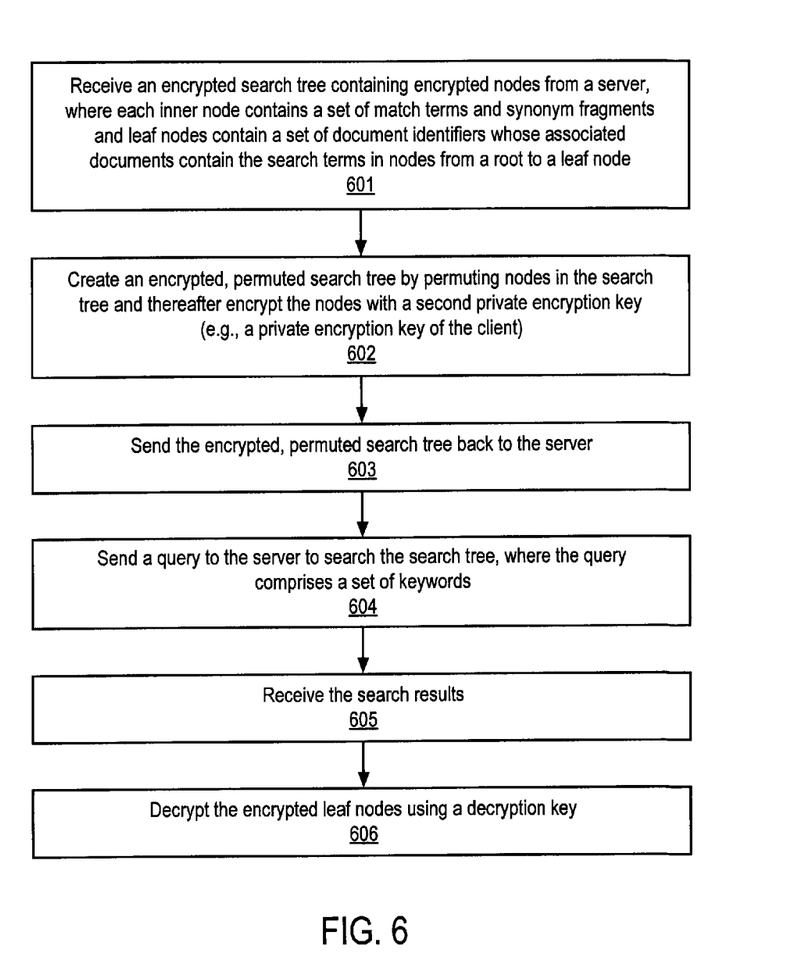
FIG. 6 is another flow diagram of one embodiment of a process for performing a search on a set of documents.

FIG. 6 is another flow diagram of one embodiment of a process for performing a search on a set of documents. The process is performed by processing logic that may comprise hardware (circuitry, dedicated logic, etc.), software (such as is run on a general purpose computer system or a dedicated machine), or a combination of both. In one embodiment, the process is performed by a client.

Referring to FIG. 6, the process begins by processing logic receiving an encrypted search tree containing encrypted nodes from a server, where each inner node contains a set of match terms and synonym fragments and leaf nodes contain a set of document identifiers whose associated documents contain the search terms in nodes from a root to a leaf node (processing block 601). In one embodiment, the search tree is balanced. In one embodiment, the nodes of the search tree are encrypted with a first private encryption key (e.g., a private key of the server) to produce the encrypted search tree.

With the encrypted search tree, processing logic creates an encrypted, permuted search tree by permuting nodes in the search tree and thereafter encrypting the nodes with a second private encryption key (e.g., a private encryption key of the client) (processing block 602). In one embodiment, the processing logic permutes the nodes in the search tree have separately using a shuffling procedure to obfuscate the tree.

Processing logic sends the encrypted, permuted search tree back to the server (processing block 603).

Subsequently, processing logic sends a query to the server to search the search tree, where the query comprises a set of keywords, and each query term is encrypted with the second private encryption key (processing block 604). In one embodiment, the query comprises an encrypted version of a multiplicative inverse of each query term.

Once the search has been completed, processing logic receives the search results, which are based on a match of keywords for each document (processing block 605). The results include one or more encrypted leaf nodes of the tree, where the encrypted leaf nodes encrypted with the second private encryption key.

Processing logic decrypts the encrypted leaf nodes using a decryption key (processing block 606).

One Embodiment of a Server

In one embodiment, the server comprises a memory, a network interface, and a processor. The memory stores an encrypted, permuted search tree with nodes that have been permuted and encrypted for use in handling subsequent searches based on queries. The communication interface receives one or more queries from a client. In response to these queries, the processor, which is coupled to the memory and the communication interface, performs a search using the query by performing an oblivious matching keyword test in which an evaluation occurs at each node of the tree to determine if one or more matches exist, and returns, via the communication interface, results based on a match of keywords for each document. In one embodiment, the results include one or more encrypted leaf nodes of the tree.

Figure 7:
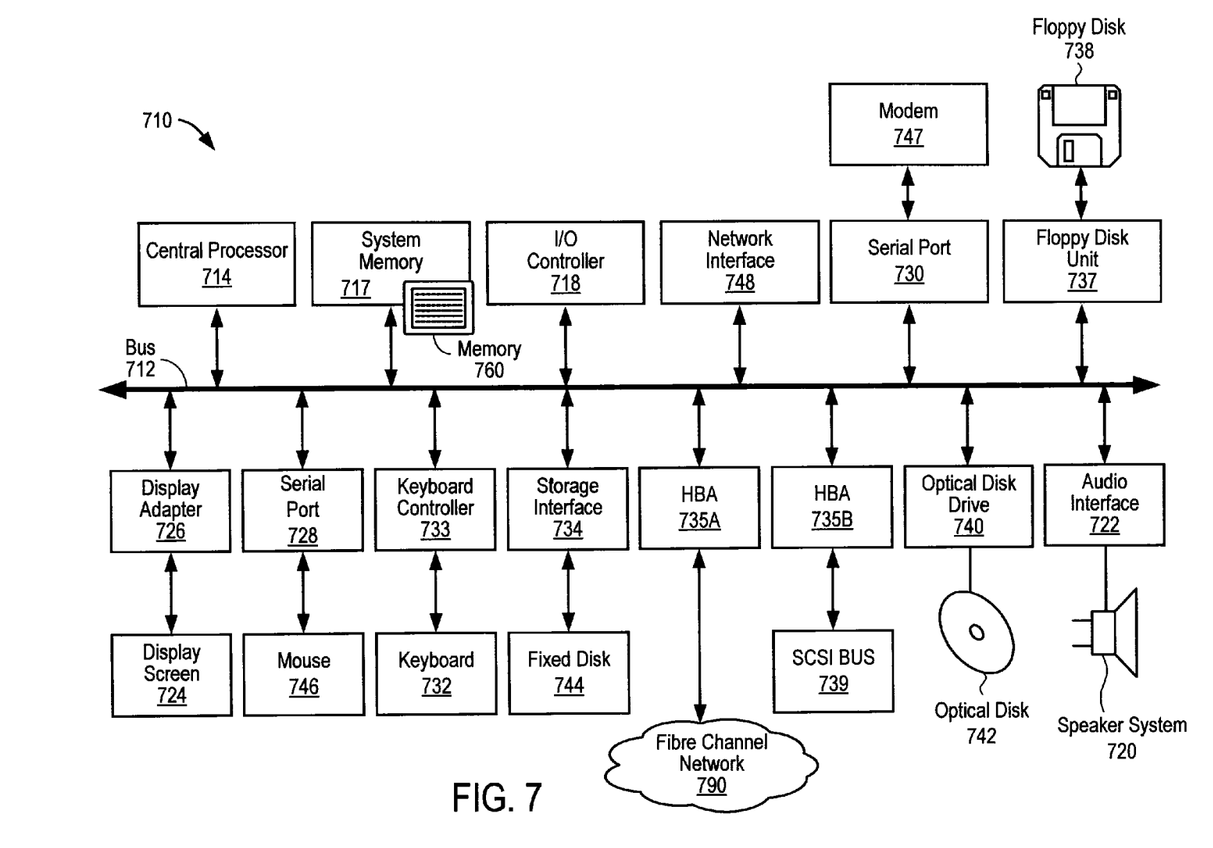
FIG. 7 depicts a block diagram of one embodiment of a server.

FIG. 7 depicts a block diagram of one embodiment of a server, such as server 102 of FIG. 1. Referring to FIG. 7, server 710 includes a bus 712 to interconnect subsystems of server 710, such as a processor 714, a system memory 717 (e.g., RAM, ROM, etc.), an input/output controller 718, an external device, such as a display screen 724 via display adapter 726, serial ports 728 and 730, a keyboard 732 (interfaced with a keyboard controller 733), a storage interface 734, a floppy disk drive 737 operative to receive a floppy disk 738, a host bus adapter (HBA) interface card 735A operative to connect with a Fibre Channel network 790, a host bus adapter (HBA) interface card 735B operative to connect to a SCSI bus 739, and an optical disk drive 740. Also included are a mouse 746 (or other point-and-click device, coupled to bus 712 via serial port 728), a modem 747 (coupled to bus 712 via serial port 730), and a network interface 748 (coupled directly to bus 712).

Bus 712 allows data communication between central processor 714 and system memory 717. System memory 717 (e.g., RAM) may be generally the main memory into which the operating system and application programs are loaded. The ROM or flash memory can contain, among other code, the Basic Input-Output system (BIOS) which controls basic hardware operation such as the interaction with peripheral components. Applications resident with computer system 710 are generally stored on and accessed via a computer readable medium, such as a hard disk drive (e.g., fixed disk 744), an optical drive (e.g., optical drive 740), a floppy disk unit 737, or other storage medium.

Storage interface 734, as with the other storage interfaces of computer system 710, can connect to a standard computer readable medium for storage and/or retrieval of information, such as a fixed disk drive 744. Fixed disk drive 744 may be a part of computer system 710 or may be separate and accessed through other interface systems.

Modem 747 may provide a direct connection to a remote client via a telephone link or to the Internet via an internet service provider (ISP) (e.g., clients 101 of FIG. 1). Network interface 748 may provide a direct connection to a remote client such as, for example, clients 101 of FIG. 1. Network interface 748 may provide a direct connection to a remote client (e.g., client 101 of FIG. 1) via a direct network link to the Internet via a POP (point of presence). Network interface 748 may provide such connection using wireless techniques, including digital cellular telephone connection, a packet connection, digital satellite data connection or the like.

Many other devices or subsystems (not shown) may be connected in a similar manner (e.g., document scanners, digital cameras and so on). Conversely, all of the devices shown in FIG. 7 need not be present to practice the techniques described herein. The devices and subsystems can be interconnected in different ways from that shown in FIG. 7. The operation of a computer system such as that shown in FIG. 7 is readily known in the art and is not discussed in detail in this application.

Code to implement the server operations described herein can be stored in computer-readable storage media such as one or more of system memory 717, fixed disk 744, optical disk 742, or floppy disk 738. The operating system provided on computer system 710 may be MS-DOS®, MS-WINDOWS®, OS/2®, UNIX®, Linux®, or another known operating system.

Figure 8:
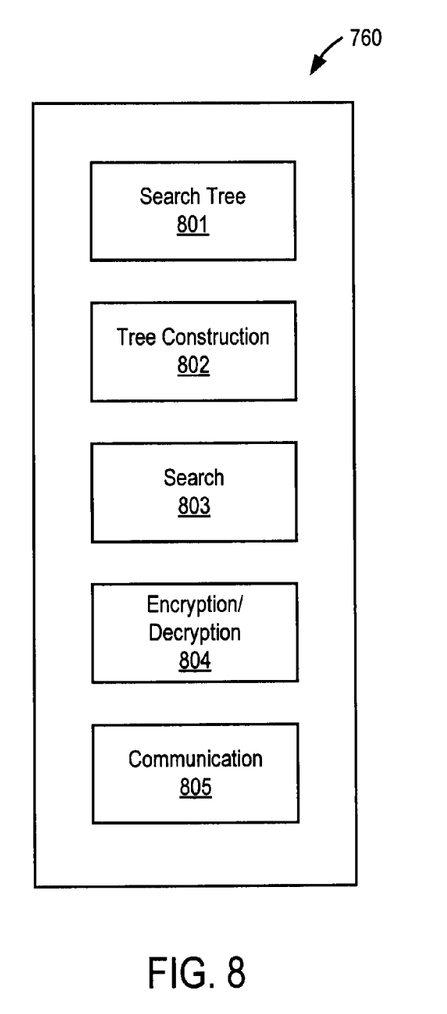
FIG. 8 illustrates a set of code and data that is stored in memory of one embodiment of a server.

FIG. 8 illustrates a set of code (e.g., programs) and data that is stored in memory of one embodiment of a server, such as the server set forth in FIG. 7. The server uses the code, in conjunction with a processor, to perform the necessary operations described herein.

Memory 760 stores a search tree (e.g., a table) 801 that can be searched using a keyword search. Memory 760 also stores tree construction module 802, which when executed by a processor, causes the processor to construct a search tree. Memory 760 stores a search module 803 for performing searches of the search tree based on queries received from clients.

Memory 760 also stores encryption/decryption module 804 which, when executed by a processor, causes the processor to perform encryption and/or decryption to facilitate encryption and decryption of nodes of the search tree. Communication module 805, which, when executed by a processor, causes the processor exchange encrypted search trees with a client as well as receive queries and return search results.

As described above, clients 101 in FIG. 1 may be implemented using a computer system such as shown in FIG. 7, except using different code to implement the techniques and operations performed by such clients. The code is stored in computer-readable storage medium such as system memory 717, fixed disk 744, optical disk 742 or floppy disk 748. This code includes code to implement search tree construction, to received queries, to perform searches on the tree based on the queries, and to send search results to clients.

Figure 9:
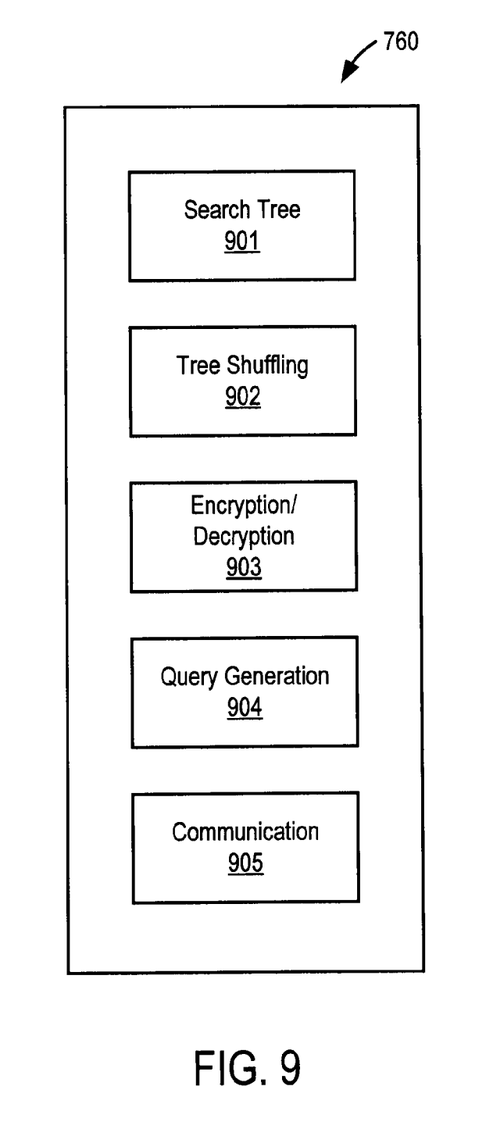
FIG. 9 illustrates a set of code and data that is stored in memory of one embodiment of a client.

FIG. 9 illustrates a set of code (e.g., programs) and data that is stored in memory of one embodiment of a client, such as a client implemented with the computer system in FIG. 7. The client uses the code, in conjunction with a processor, to perform the necessary operations described herein.

Memory 760 stores a search tree (e.g., a table) 901 that is received from the server. Memory 760 also stores search tree shuffling module 902, which when executed by a processor, causes the processor to shuffle nodes of the search tree as described above. Memory 760 also stores encryption/decryption module 903 which, when executed by a processor, causes the processor to perform encryption and/or decryption to facilitate encryption and decryption of nodes of the search tree. Query generation module 904 generates queries for searching the search tree as described above. Communication module 905, which, when executed by a processor, causes the processor exchange encrypted search trees with a server, as well as send queries and receive search results from a server.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method for performing a search on a set of documents, the method comprising:
    encrypting nodes of a search tree, at a server, with a first private encryption key to produce an encrypted search tree;
    sending the encrypted search tree to a client;
    receiving an encrypted, permuted search tree from the client at the server, wherein nodes of the encrypted search tree have been permuted and encrypted by the client, the encrypted, permuted search tree having been encrypted with a second private encryption key, wherein the second private encryption key is different than the first private encryption key;
    decrypting the encrypted, permuted search tree using a first decryption key, corresponding to the first private encryption key, to produce a tree with nodes encrypted with the second private encryption key based on a commutative property of homomorphic encryption;
    receiving, at the server, a query from the client, the query comprising a set of keywords, wherein each query term is encrypted with the second private encryption key;
    performing a search using the query, including performing an oblivious matching keyword test in which an evaluation occurs at each node of the decrypted encrypted, permuted search tree to determine if one or more matches exist; and
    returning results to the client based on a match of keywords for each document, the results including one or more encrypted leaf nodes of the tree, the encrypted leaf nodes encrypted with the second private encryption key.

2. The method defined in claim 1 wherein the nodes in the encrypted, permuted search tree have been permuted separately using a shuffling procedure to obfuscate an encrypted search tree.

3. The method defined in claim 1 wherein the search tree is balanced.

4. The method defined in claim 1 further comprising, prior to receiving the encrypted, permuted search tree, the server constructing the search tree such that each node contains a set of match terms and synonym fragments and leaf nodes contain a set of document identifiers whose associated documents contain the match terms in nodes from a root to a leaf node.

5. The method defined in claim 4 further comprising encrypting the nodes of the search tree with the second private encryption key.

6. The method defined in claim 4 wherein each of the document identifiers is associated with a patent number.

7. The method defined in claim 1 wherein the query comprises an encrypted version of a multiplicative inverse of each query term.

8. An apparatus for performing a search on a set of documents, the apparatus comprising:
    a memory for storing an encrypted, permuted search tree received from a client with nodes that have been permuted and encrypted, the encrypted, permuted search tree having been encrypted with a first private encryption key of the client;
    a communication interface to receive a query from a client, the query comprising a set of keywords, wherein each query term is encrypted with the first private encryption key; and
    a processor coupled to the memory and the communication interface to
        prior to receiving the encrypted, permuted search tree, encrypt nodes of a search tree with a second private encryption key to produce an encrypted search tree, the second private encryption key being different than the first private encryption key, and send the encrypted search tree, via the communication interface, to the client,
        after receipt of the query from the client, decrypt the encrypted, permuted search tree using a second decryption key to produce a tree with nodes encrypted with the first encryption key based on a commutative property of homomorphic encryption, perform a search using the query, including performing an oblivious matching keyword test in which an evaluation occurs at each node of the decrypted encrypted, permuted search tree to determine if one or more matches exist, and return, via the communication interface, results to the client based on a match of keywords for each document, the results including one or more encrypted leaf nodes of the tree, the encrypted leaf nodes encrypted with the first private encryption key.

9. The apparatus defined in claim 8 wherein the nodes in the encrypted, permuted search tree have been permuted separately using a shuffling procedure to obfuscate an encrypted search tree.

10. The apparatus defined in claim 8 wherein the search tree is balanced.

11. The apparatus defined in claim 8 wherein the processor, prior to receiving the encrypted, permuted search tree, constructs the search tree such that each node contains a set of match terms and synonym fragments and leaf nodes contain a set of document identifiers whose associated documents contain the match terms in nodes from a root to a leaf node.

12. The apparatus defined in claim 11 wherein the processor encrypts the nodes of the search tree with the second private encryption key.

13. The apparatus defined in claim 8 wherein the query comprises an encrypted version of a multiplicative inverse of each query term.

14. An article of manufacture comprising one or more non-transitory computer readable storage media having instruction stored thereon which when executed by a system cause the system to perform a method for searching a set of documents, the method comprising:

encrypting nodes of a search tree, at a server, with a first private encryption key to produce an encrypted search tree;

sending the encrypted search tree to a client;

receiving an encrypted, permuted search tree from the client at the server, wherein nodes of the encrypted search tree have been permuted and encrypted by the client, the encrypted, permuted search tree having been encrypted with a second private encryption key, wherein the second private encryption key is different than the first private encryption key;

decrypting the encrypted, permuted search tree using a first decryption key, corresponding to the first private encryption key, to produce a tree with nodes encrypted with the second private encryption key based on a commutative property of homomorphic encryption;

receiving, at a communication interface of the server, a query from a client, the query comprising a set of keywords, wherein each query term is encrypted with the second private encryption key;

performing, using a processor of the system, a search based on the query, including performing an oblivious matching keyword test in which an evaluation occurs at each node of the decrypted encrypted, permuted search tree to determine if one or more matches exist; and returning results to the client based on a match of keywords for each document, the results including one or more encrypted leaf nodes of the tree, the encrypted leaf nodes encrypted with the second first private encryption key.

15. The article of manufacture defined in claim 14 wherein the nodes in the encrypted, permuted search tree have been permuted separately using a shuffling procedure to obfuscate an encrypted search tree.

\* \* \* \* \*